Patented Nov. 11, 1930

1,781,232

UNITED STATES PATENT OFFICE

FREDERICK W. HUBER, OF RIVERSIDE, CALIFORNIA

MAKING PORTLAND CEMENT

No Drawing.   Application filed March 19, 1930. Serial No. 437,277.

Portland cement is ordinarily prepared by calcining and clinkering a finely ground mixture containing calcareous material and clay or other argillaceous material in certain proportions and grinding the product to such a fineness as to impart hydraulic properties thereto.

So far as I am advised calcareous material containing any substantial proportion of $P_2O_5$ (or phosphates) has not been successfully used in the manufacture of Portland cement.

It has long been known by those familiar with the art that cements made from marl or limestone containing $P_2O_5$ are slow setting and very slow hardening if the cement contains more than 1% $P_2O_5$. Furthermore these cements are so difficult to burn that the lime content must be carried so low to get an economical burning temperature that the product is inferior to the cement carrying a higher lime content and containing little or no $P_2O_5$, so much so that their utility is much restricted. There are marl and limestone deposits containing up to 3% $P_2O_5$ whose geographical locations would give them a substantial advantage in cost of manufacture and distribution if the disadvantage of the $P_2O_5$ content could be overcome.

The object of my invention is a process which would make available such deposits for the manufacture of very superior Portland cement.

I have studied in particular a marl containing 2% $P_2O_5$, in the form of tricalcium phosphate. A raw cement mix proportioned to give a "high lime" cement was compounded from this material and clay, and this mix was burned to give a good appearing clinker in the usual manner in a rotary kiln on an operating scale. The resulting clinker contained 4.5% of free lime, (uncombined CaO) and the cement produced by grinding this would not pass the boiling test and the early strength of the mortar made therefrom was below the requirements of standard specifications notwithstanding the fact that the clinker was ground to a fineness much in excess of the usual requirements and far above what is customary. Furthermore the cement when made into concrete and maintained at a temperature below 60° F., would refuse to set up.

Now I have found that the presence of even 1.5% of $P_2O_5$ in the raw cement mix raises the clinkering temperature above that usually employed in burning cement. In fact raises it to a point which cannot economically be attained in a rotary kiln, i. e. to 1500° C.

But even this increase in temperature does not serve to give complete combination, unless the clinker is ground and reburned a second time at this temperature, which would only give a fair grade of cement.

I have found that a mineralizer is necessary, i. e. a substance which stimulates and brings about the combination of the various substances to form definite "mineral" entities, such as the all important "mineral", tricalcium silicate, $3CaO \cdot SiO_2$ upon which depends the virtue and hardening properties of Portland cement.

Ordinarily such mineralizers as $Fe_2O_3$ and $Al_2O_3$ are found associated with the raw material in a sufficient amount. But in the presence of $P_2O_5$ these mineralizers are converted into iron phosphate (and possibly aluminum phosphate) which has a very high melting point which makes this fluxing action practically nil. So that the fluxing or mineralizing action of the $Fe_2O_3$ has been defeated by the $P_2O_5$ present in the raw mix, and as a consequence a much higher temperature would be necessary to bring about the chemical combination into cement "minerals".

By the present invention it is readily possible to produce a high grade Portland cement which will harden readily, by using any suitable argillaceous material such as clay, in the amount needed, and using a calcareous material which may contain up to 2 or 3%, or even slightly more, of $P_2O_5$, and by using an amount of ferric oxide or other substance furnishing iron, in amount somewhat more than the chemical equivalent of the phosphoric acid radical present, by the ordinary burning method in a rotary kiln, and at temperatures readily attainable in a rotary kiln, say 1300 to 1400° C.

In the case of a particular factory which was erected for the manufacture of Portland cement, it was found that the cement refused to set up properly due to the fact that the limestone which they were using contained a substantial amount of phosphoric acid and as a result, it was found necessary to ship in phosphate-free raw materials from a considerable distance, although iron ore was available at a mine only a few miles away.

As a specific example of the present invention, a cement raw mix was made from phosphatic marl and clay (analysis given below). A quantity of this raw mix was burned in a rotary kiln at 1400° C., yielding a clinker (hereinafter called "first clinker") which was of good appearance but which was found to contain about 4.5% of uncombined (free) lime. The said clinker even after grinding finer than ordinary Portland cement was found to be highly unsatisfactory. A portion of the clinker when ground to 20 mesh and reburned at 1500° C., gave a clinker containing about 0.5% of free lime and the cement while greatly improved, was only of fair quality.

To another portion of the same raw mix 1.2% of ferric oxide was added and the mixture was then calcined and clinkered by heating it in a rotary kiln, to about 1400° C., giving upon grinding, a cement of excellent quality.

The analysis of the original raw mix (before adding the iron oxide), the "first clinker" and the "iron clinker" (clinker produced by the addition of ferric oxide and burning) are as follows:—

|  | Raw mix | "First clinker" | "Iron clinker" |
|---|---|---|---|
| $SiO_2$ | 13.81 | 20.92 | 20.55 |
| $Al_2O_3$ | 2.97 | 4.50 | 4.42 |
| $Fe_2O_3$ | 1.98 | 3.00 | 4.79 |
| $CaO$ | 43.96 | 65.80 | 64.40 |
| $P_2O_5$ | 1.60 | 2.42 | 2.37 |
| Ign. loss | 34.00 | 0 | 0 |

It will be seen that in the present invention it is possible to overcome the defects of the cement produced when burning crude raw material containing the phosphoric acid radical, by converting the entire amount of phosphoric acid into ferric phosphate which is substantially inert under these conditions, and leaving enough additional iron oxide to act as a mineralizer. The amount of iron oxide (ferric oxide) so combining will be about 1.1 parts of ferric oxide to 1 part of $P_2O_5$ in the raw mix.

I have above referred to the addition to the raw mix, of $Fe_2O_3$ in the form of iron ore. Other iron-containing materials which contain ferric oxide can be employed, such as ferrous carbonate ore, roasted pyrites, clays or shales rich in iron, waste metallurgical materials or residues from ore concentration or rolling mill scale which contains substantial amounts of iron, and the like, or in fact various products or materials, which during the clinkering operation would be converted into ferric oxide, can be used for this purpose.

What has been said above about the disadvantage of $P_2O_5$ in marl is equally applicable in the case of limestone, chalk, and blast furnace slag, and other calcareous materials containing $P_2O_5$ in any substantial amount.

Up to now, no phosphatic raw materials have been made into Portland cement commercially.

From the above description it will be seen that making a satisfactory Portland cement from any raw materials containing phosphate is readily possible by adding the iron-containing material in such amount as to convert all of the $P_2O_5$ into ferric phosphate and to have a sufficient excess to act as a mineralizer.

I claim:—

1. In the manufacture of Portland cement from a raw material which contains calcium phosphate in substantial amounts and in which the mineralizing components are in too small amount to give a good cement by burning with argillaceous material at usual cement burning temperature and pulverizing, the herein described improvement which comprises adding argillaceous material to the said material, and adding an iron oxide material in such amount as to bring the total iron content up to substantially above the chemical equivalent of the phosphate radical content, then burning the mix at the usual cement burning temperature and under conditions capable of converting substantially the entire amount of phosphate radical into iron phosphate while leaving a substantial amount of iron oxide to act as a mineralizing agent for the cement, and thereafter reducing the burned material to a fine powder.

2. In the manufacture of Portland cement from phosphatic marl and clay, the herein described step of adding iron oxide material to the marl, in amount more than the excess of phosphoric acid radical over iron oxide in the marl.

3. In making cement from a phosphatic raw mix, the step of clinkering such a raw mix, while associated with enough iron compounds to convert all $P_2O_5$ into iron phosphate, and enough excess of iron compounds to constitute a mineralizer.

4. In the manufacture of cement from calcareous and argillaceous materials, which contain phosphate in notable proportion, the steps of incorporating a ferruginous material therewith, in such amount as to bring the $Fe_2O_3 : P_2O_5$ ratio to, well above 1:1, and thereafter burning the mixture under the usual cement-burning conditions, whereby the phosphate content of the mix is converted into ferric phosphate, and the residual iron becomes effective as a mineralizer.

5. A Portland cement having at least moderately quick hardening properties, containing phosphoric acid wholly in the form of iron phosphate.

In testimony whereof I affix my signature.

FREDERICK W. HUBER.